J. L. NICHOLSON.
LOCOMOTIVE BOILER.
APPLICATION FILED DEC. 26, 1918.
1,337,720.
Patented Apr. 20, 1920.
7 SHEETS—SHEET 1.
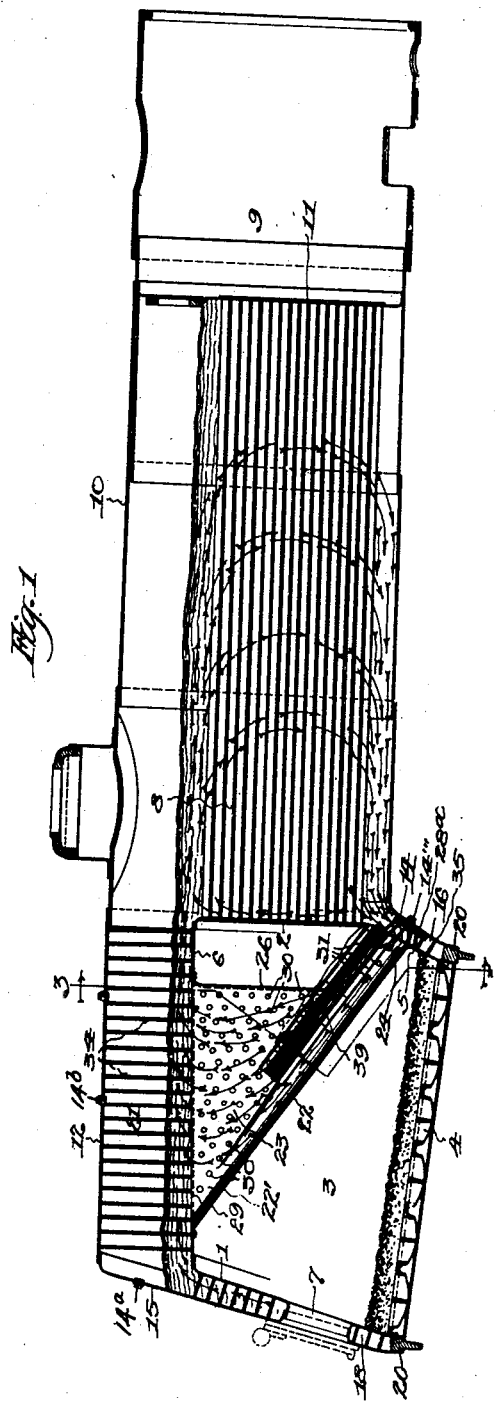
Witness:
Inventor:
John L. Nicholson
Atty

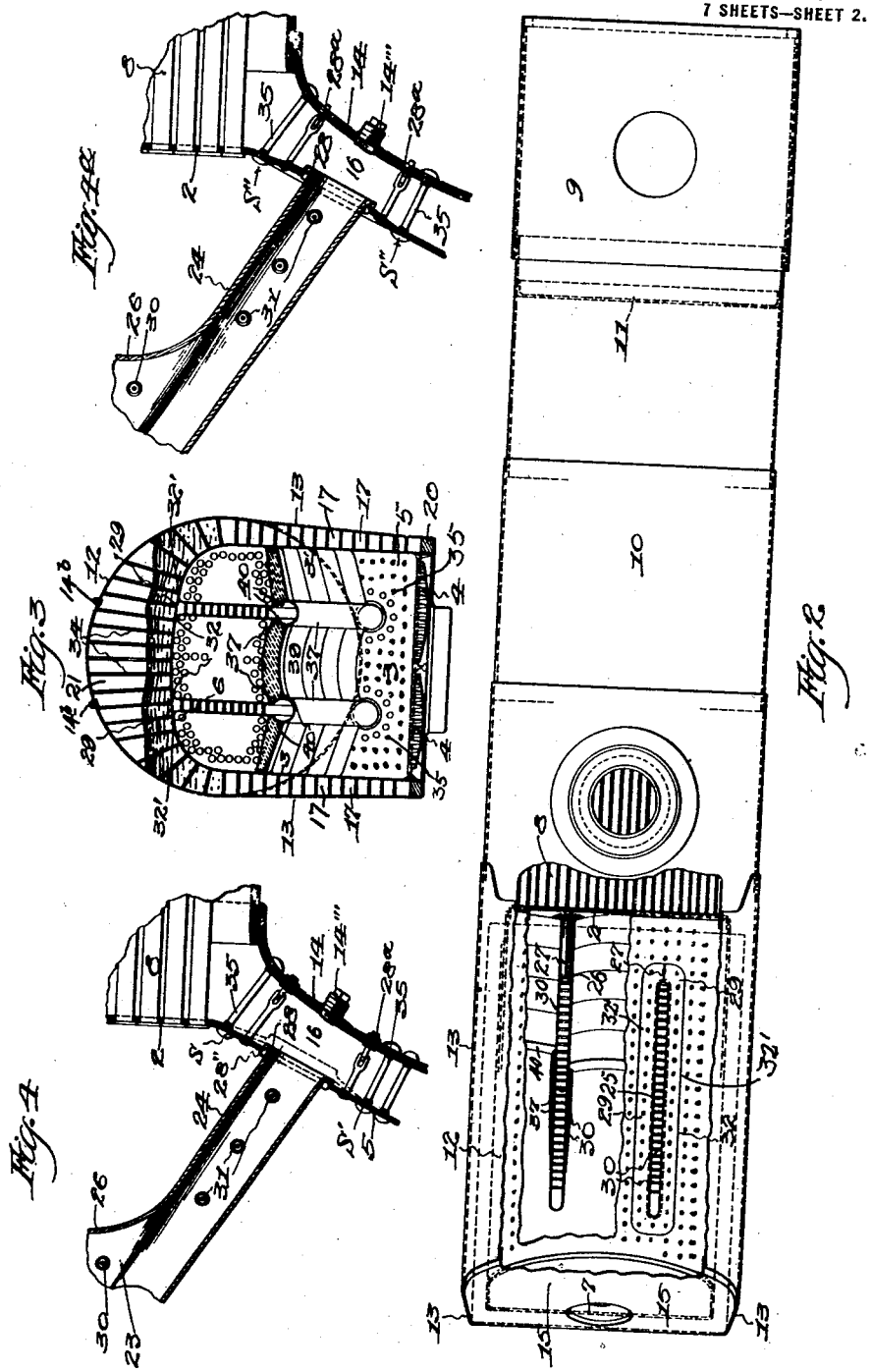

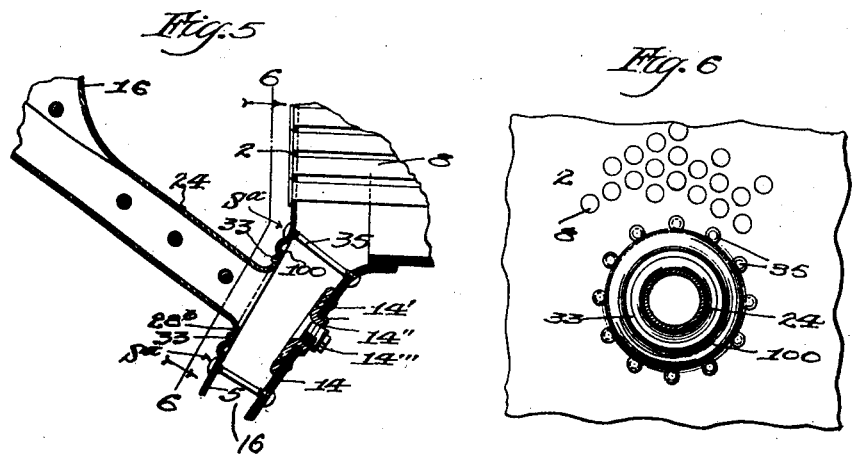
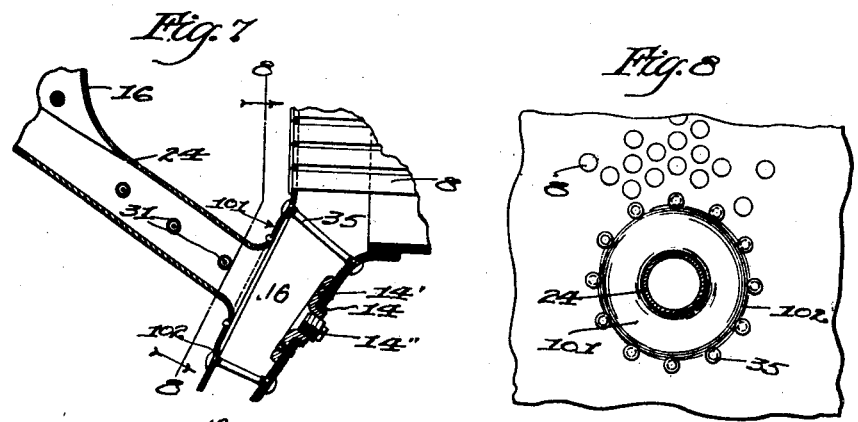
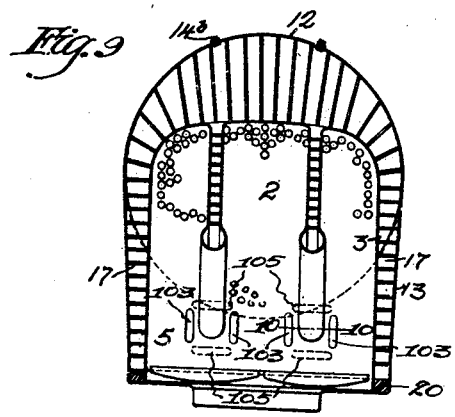
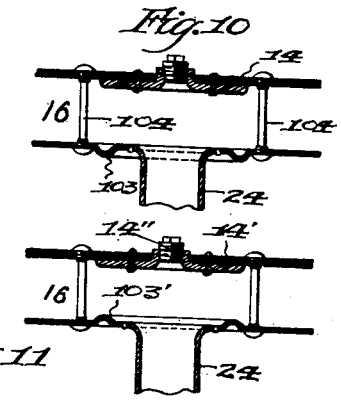

J. L. NICHOLSON.
LOCOMOTIVE BOILER.
APPLICATION FILED DEC. 26, 1918.
1,337,720.
Patented Apr. 20, 1920.
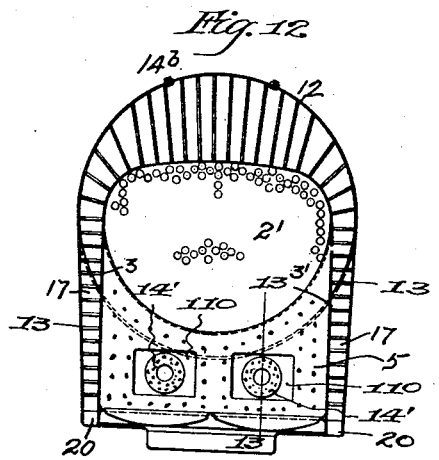
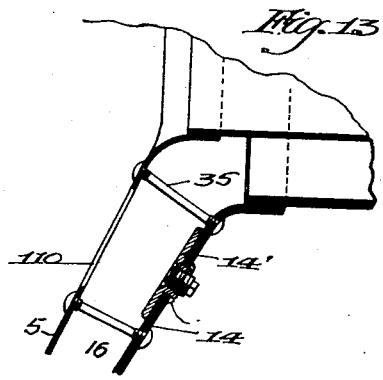
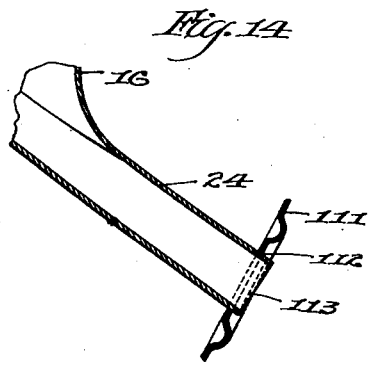
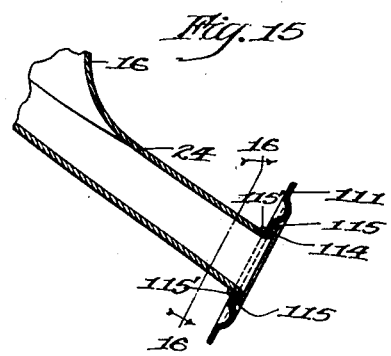
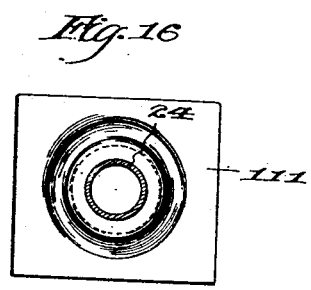
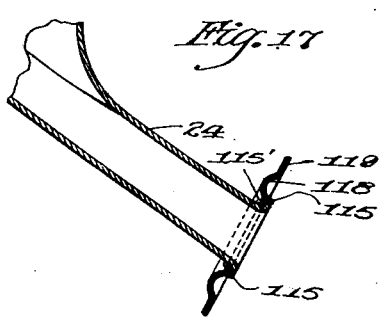

J. L. NICHOLSON.
LOCOMOTIVE-BOILER.
APPLICATION FILED DEC. 26, 1918.
1,337,720.
Patented Apr. 20, 1920.
7 SHEETS—SHEET 5.
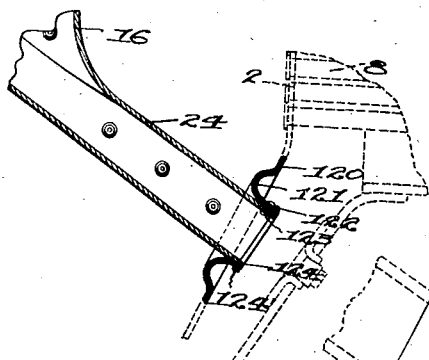
Fig. 18a
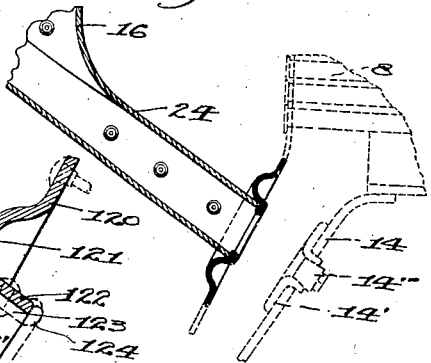
Fig. 19
Fig. 18
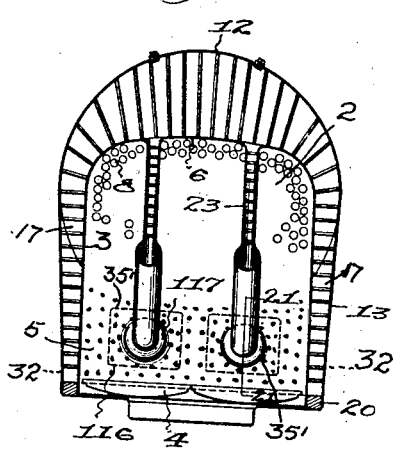
Fig. 20
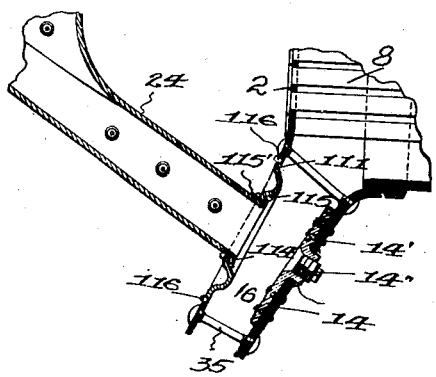
Fig. 21
Witness:
Earl E. Towe
Inventor:
John L. Nicholson
By:
Atty.

J. L. NICHOLSON.
LOCOMOTIVE BOILER.
APPLICATION FILED DEC. 26, 1918.
1,337,720.
Patented Apr. 20, 1920.
7 SHEETS—SHEET 6.
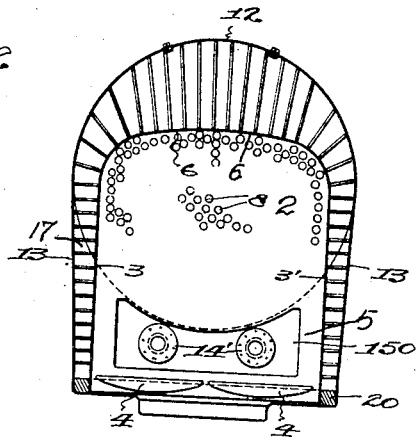
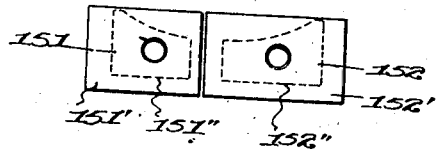
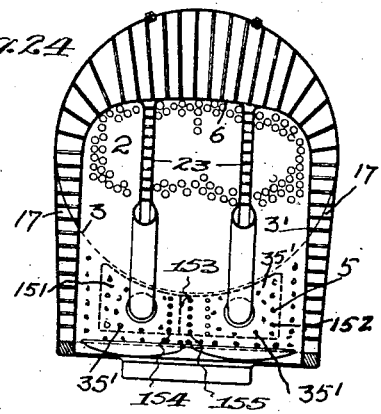
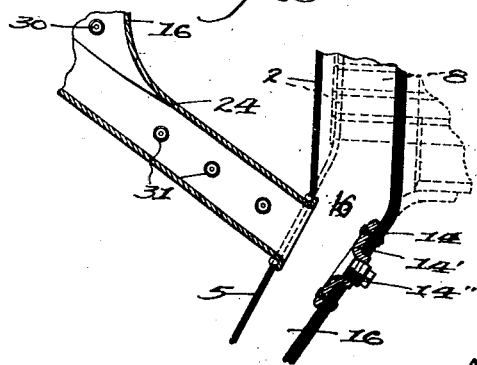
Witness:
Inventor:
John L. Nicholson

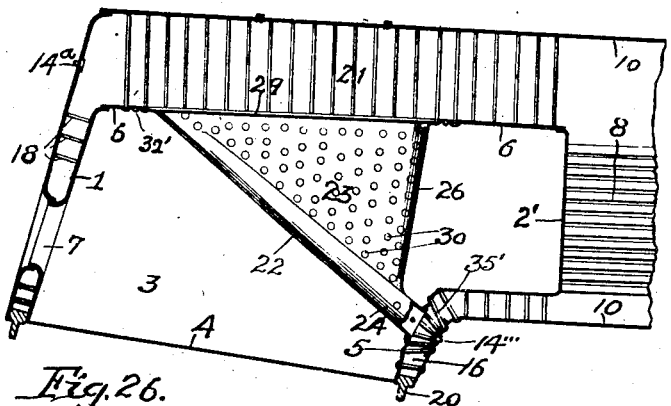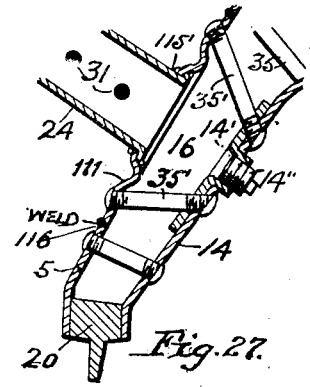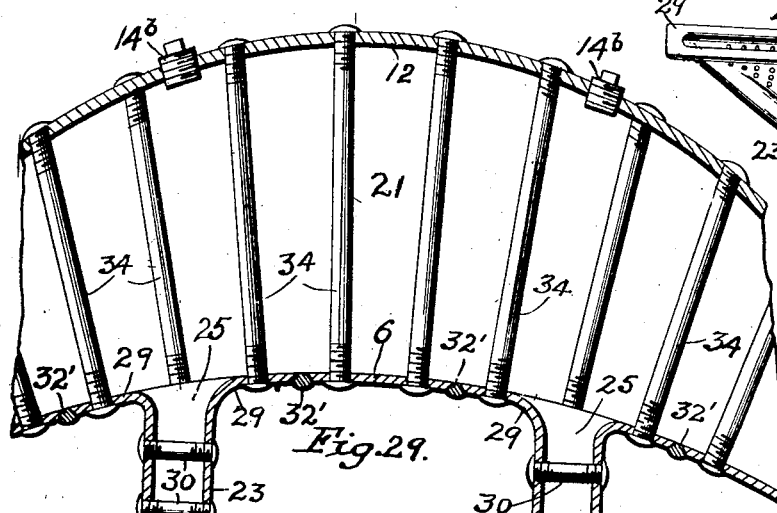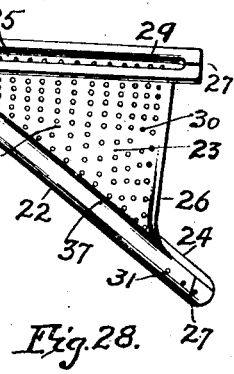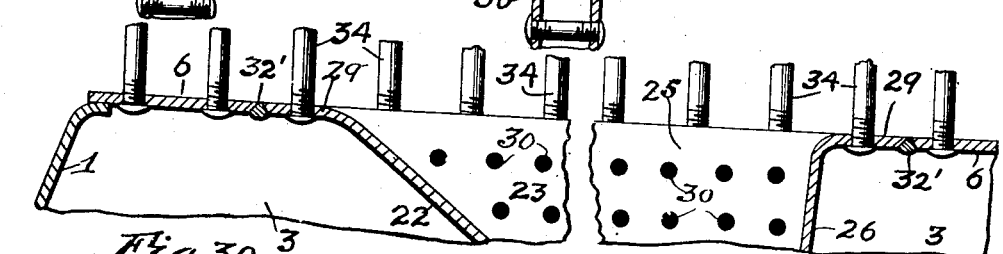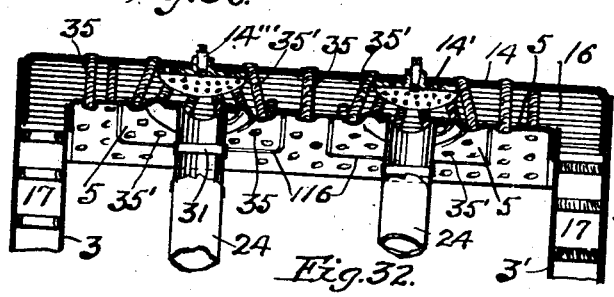

UNITED STATES PATENT OFFICE.

JOHN L. NICHOLSON, OF CHICAGO, ILLINOIS, ASSIGNOR TO LOCOMOTIVE FIREBOX COMPANY, OF CHICAGO, ILLINOIS, A CORPORATION OF DELAWARE.

LOCOMOTIVE-BOILER.

1,337,720.  Specification of Letters Patent.  Patented Apr. 20, 1920.

Application filed December 26, 1918. Serial No. 268,260.

*To all whom it may concern:*

Be it known that I, JOHN L. NICHOLSON, a citizen of the United States, and a resident of Chicago, county of Cook, and State of Illinois, have invented certain new and useful Improvements in Locomotive-Boilers, of which the following is a specification.

My invention relates to improvements in locomotive boilers and has particular reference to the fireboxes thereof. The general object of my invention is to obtain a more efficient combustion of the fuel in the firebox; to obtain a more efficient thermic transmission between products of combustion and boiler water, and to improve the circulation of the water within the boiler, so that the capacity, efficiency and durability of both the firebox and boiler shell be increased.

My invention consists generally in the form, construction, arrangement, combination and coaction of parts whereby the above named objects and purposes, together with others that will appear hereinafter, are attainable.

My invention will be more readily understood by reference to the accompanying drawings showing preferred embodiments thereof. In said drawings:

Figure 1 is a vertical longitudinal section of a locomotive boiler illustrating my invention embodied therein;—Fig. 2 is a plan view thereof, partly in section, better to disclose the construction and position of the water circulating elements in a firebox that contains two thereof;—Fig. 3 is a vertical section substantially on the irregular line 3—3 of Fig. 1;—Fig. 4 is an enlarged sectional detail showing, in one form, the flexible juncture of the water circulating element with the throat sheet;—Fig. 4ᵃ is a sectional detail view similar to Fig. 4, but showing the parts under the effect of expansion in the water circulating element;—Fig. 5 is a sectional detail, similar to Fig. 4, but illustrating a flexible connection of modified construction;—Fig. 6 is a view substantially on the line 6—6 of Fig. 5;—Fig. 7 is a longitudinal vertical section like Figs. 4 and 5, but differing in minor details;—Fig. 8 is a section on the line 8—8 of Fig. 7;—Fig. 9 is a transverse vertical section of my novel boiler showing a flue sheet of still another form which affords flexibility between the same and the water circulating elements;—Fig. 10 is an enlarged detail sectional view substantially on the line 10—10 of Fig. 9 and showing two stay bolts in position, also a reinforcement of the opposed sheet of the boiler shell;—Fig. 11 is like Fig. 10, but with the corrugations reversed;—Fig. 12 is a transverse vertical sectional view of a locomotive firebox of the so-called combustion chamber type and incidentally illustrating one of the steps of equipping a locomotive firebox with water circulating elements in accordance with my invention;—Fig. 13 is an enlarged sectional view substantially on the line 13—13 of Fig. 12 but showing only two, of the many, stay bolts;—Fig. 14 is a sectional detail illustrating the step toward equipping the water circulating element with a flexible diaphragm or sheet ready to be secured in a preformed opening such as shown in the front or flue sheet of Figs. 12 and 13;—Fig. 15 shows the same parts as Fig. 14, but illustrates the union of the parts completed;—Fig. 16 is a detail view of the lower end or intake neck of the water circulating element, on the line 16—16 of Fig. 15;—Figs. 17 and 18 are detail sectional views illustrating corrugated, flexible diaphragm-like parts of different forms also suited to the neck of a water circulating element;—Fig. 18ᵃ illustrates the diaphragm of Fig. 18 connected to a water circulating element;—Fig. 19 illustrates a flexible union of still another form;—Fig. 20 is a view similar to Fig. 12 but illustrating the water circulating elements in place;—Fig. 21 is an enlarged detail sectional view, substantially on the line 21—21 of Fig. 20, but showing the innermost stay bolts outside the weld which joins the flexible diaphragm to the flue sheet;—Fig. 22 should be compared to Fig. 12 and shows that only a single opening need be cut in the front or throat sheet of the firebox to accommodate the flexible flanges or diaphragms belonging to a plurality of water circulating elements;—Fig. 23 is a face view of the pre-formed flexible flange or diaphragm sheets suited to a case such as shown in Fig. 22, the dotted lines showing the sizes and forms to which the sheets are to be sheared or cut to fit them to an opening like that in the throat sheet of Fig. 22;—Fig. 24 is a view similar to Fig. 22 but with the diaphragm flange portions or plates welded in place and properly stay-bolted; Fig. 25 is a detail sectional view illustrating the adaptability of my invention to throat sheets of various forms;—Fig. 26 is a vertical longitudinal section taken from Figs. 12 and 13, being a firebox of the combustion chamber type, and showing the water circulating elements in working position;—Fig. 27 amplifies Fig. 13 inasmuch as it shows the applied flexible flange portion or diaphragm plate welded in place and stay bolted; and in respect to the latter, Fig. 27 may be read as an enlargement taken from Fig. 1;—Fig. 28 is a perspective view of a complete water circulating element ready to be installed in a firebox;—Fig. 29 is an enlargement of the upper part of Fig. 3 or of Figs. 9, 20 or 24; better showing the preferred form of the tops of the water circulating elements and manner of uniting same to the crown sheet and of supporting both the elements and the welds from the top or wrapper sheet of the boiler shell;—Fig. 30 is a longitudinal, vertical section of the juncture of the crown sheet and the upper rear end of the water circulating element enlarged from Fig. 1;—Fig. 31 is a like view of the upper forward end of the element and crown sheet;—and Fig. 32 is an enlarged horizontal section on the line 32—32 of Fig. 20.

As indicated, my invention is intended for, and is specially applicable to, locomotive boiler fireboxes that have fire chambers which extend from the back sheet, 1, to the flue sheet, 2 (2' in Figs. 12 and 26), and from one side sheet, 3, to the other side sheet, 3'; with a grate or bottom, 4, that corresponds to such dimensions, except as modified by differing designs and positions of the throat sheet, 5, with respect to the flue sheet; (compare Figs. 1, 3, 12 and 26). The top of the firebox is formed by the crown sheet, 6. Commonly, such fireboxes have a single door, 7, through which the fuel is introduced. The products of combustion are withdrawn through the flues, 6, by the action of the exhaust nozzle (not shown) in the front end, 9, of the boiler. As usual, the shell of the boiler comprises the barrel, 10, the front flue sheet, 11, and the firebox wrapper; the latter composed of the top plate, 12, the side plates, 13, the outside throat plate, 14, and the back plate, 15. The wrapper together with the fire sheets or walls of the firebox, defines the several water legs of the boiler, to wit, the front leg or throat, 16, the side legs, 17, 17, and the back water leg, 18, all bottomed by a mud ring, 20. The firebox sheets mentioned, including the crown sheet, 6, are joined to the wrapper and in the instance of a combustion chamber, as in Figs. 12 and 26, also to the barrel, 10, by means of the usual closely spaced stay bolts. Certain of these stay bolts will be specially differentiated herein because of their important relations to the water circulating elements about to be described.

In that embodiment of my invention shown in Figs. 1 to 4, inclusive, it will be seen that the firebox contains two generally triangular hollow elements which conduct water from the throat or water leg, 16, of the boiler, to the space, 21, above the crown sheet, 6. Two elements are shown, but this, it should be understood, is by way of illustration and not by way of limitation. When a plurality of elements are used they are preferably parallel and occupy vertical positions in the firebox extending longitudinally from the low throat sheet, 5, to the crown sheet and along the latter from a point back of the flue sheet to a point near the back sheet, 1. Each water circulating element, as shown, preferably is characterized by an upwardly and rearwardly inclined tubular bottom or neck portion, 22, and a progressively upwardly enlarging and generally triangular, hollow body portion, 23. The lower part of the bottom portion is a closed tube and constitutes the neck or intake portion 24 of the element, which is in open and unobstructed communication with the water space below the body of flues. As shown in the exemplary forms, the intake throat or neck, 24, leads directly from the water leg or throat, 16, of the boiler. At the top the hollow portions, 22 and 23, merge into one long slot-like opening, 25, best shown in Fig. 2, which is in open and unobstructed communication with the space, 21, above the crown sheet. Thus the water may flow and rise freely from the bottom of the boiler (as here shown, the throat, 16,) into the water circulating element; in which it is heated and hence rises rapidly into the space above the crown sheet. Much of the water is converted into steam within this element, which in turn, hastens the upward flow of the water and establishes an extremely rapid rearward and upward flow through the intakes, 24, upward, and outward through the large outlets, 25 of the elements. A vigorous fore and aft circulation throughout the boiler is thus secured; together with a constant flooding and washing of the crown sheet.

It will now be clear that my water circulating element is structurally and operatively unique in itself and in its relation to the firebox and to the boiler generally. I have given it the unique name of thermic siphon, a term which accurately describes its general construction and arrangement and the operation induced therein by the fire within the firebox; to wit, the vigorous flow of water from the lower part of the boiler and upward through the fire chamber, and the copious, rapid and widely distributed delivery of water and steam into the space on top of the crown sheet of the firebox.

My novel circulating elements or thermic siphons preferably are made of metal sheets of the same kind and thickness as the other sheets of the firebox. Preferably each element is made from a single sheet folded upon itself, after being cut to the shape desired, including preferably the neck or intake, 24, as well as the main triangular portion. The middle line of the folded sheet obviously corresponds to the extreme bottom of the tubular beam portion, 22, and the edges of the sheet preferably form the top flanges of the element and also the front, 26, thereof. After being thus folded the sheet is formed or pressed to the desired shape, a suitable mandrel or templet being used to define the internal shape of the water circulating element. Preferably the mandrel for the beam portion is tapered, so that it easily may be removed from the folded sheet, and for a further reason hereinafter mentioned. When the portions 22, 24 and 26, have been pressed to the desired shape, the meeting edges of the sheet are permanently united by an autogenous weld, 27, which extends from the lower end of the intake neck to the upper edge of the sheet. (See Figs. 2 and 28). The weld may be made electrically, or an oxy-acetylene torch may be used for the purpose. Thereafter the lower end of the neck or intake is formed for connection to the throat sheet in a manner to be described hereinafter. The upper edges of the sheet comprising the water circulating element are operated upon to form the supporting or suspension flange, 29, best shown in Figs. 1 and 2, and Figs. 28 to 31. Then the spaced apart sides of the body portion, 23, are rigidly and permanently joined by means of a large number of suitably spaced short stay bolts, 30; which operation completes the device. The front vertical row of stay bolts, 30, serve to support and protect the vertical weld, 27, in the rounded front of the element. Where the intake or neck, 24, is of considerable length, additional stay bolts, 31, may be added therein by way of precaution against the opening of the welded seam, 27.

The best thermic and circulation effects are secured and at the same time installation is facilitated, by making the width or thickness of the body portion of the element equal to the spacing between the longitudinal rows of crown or radial stay bolts, usually about four inches, in the case of locomotive boilers. This leaves the internal width of the body portion of the element large enough to allow the free upward escape of both steam and water and yet not wide enough to permit a counter downward flow of water from the space over the crown sheet. Such a counter-flow, if of any considerable volume, would tend to produce foaming and other troubles.

In the matter of an adequate supply of water through the intake and insuring a free upward and rearward flow along the bottom of the element, the best effects are secured by making the bottom, 22, straight and with an intake neck of a diameter approximately twice the internal width of the thin or upper body portion of the water element or siphon.

The intake of the element leads from the throat sheet at a point closely beneath the body of flues, 8, thereby providing ample firing clearance between the bottom or grate, 4, and the element; a matter of particular importance with respect to the refractory arch which the element supports, as hereinafter described.

As used in this specification and the appended claims, the term "throat sheet" of the firebox, means any portion of the front wall or sheet thereof, above the mud ring and below the main body of boiler flues, and wherein the throat or intake neck of the water circulating element is secured, to be in communication with the body of water in the lower part of the boiler. This general definition is made necessary by the differing shapes of locomotive fireboxes and applies to all thereof. As shown and contrasted in Figs. 3 and 12, I generally attach the intake neck of the water circulating element or elements to the lower parts, 5, of the flue sheet, whether or not a direct extension of the flue sheet proper, as in Fig. 3, or separate therefrom, as in Fig. 12. The throat sheet proper, to wit, the portion of the sheet immediately surrounding the neck or throat of the water circulating element is left, or made, free to come and go with the water circulating element as it expands and contracts. Such immediately surrounding relatively free portion of the throat sheet is hereinafter called a flexible diaphragm and may be part of the original sheet or a flexible flange portion first applied to the end of the water circulating element and having its marginal parts applied in or to the firebox sheet at the time the water circulating element is built into the firebox. As with other parts of the firebox, the front sheet, which comprises or contains the throat sheet portion, requires to be stayed to the boiler shell, but not as heretofore practised, at regular intervals; but in a modified manner hereinafter described, whereby the ordinary stays are omitted in the region surrounding the throat or intake of the water circulating element, so as to leave such portion of the throat sheet free to come and go with said element, or in lieu thereof I employ collapsible or plunger stay bolts (see examples in Figs. 4 and 4ª) which while serving as emergency stays, do not deprive the throat sheet of the flexibility required to prevent the cracking or disruption of the connected parts by the changes of position induced by differences of temperature in the several parts of the boiler.

When the water circulating element is to be installed in existing locomotives of certain types, I may connect the element to the throat sheet in the manner shown in Figs. 1 to 12. The idea will probably be best understood by reference to Figs. 4, and 4ª, wherein I have somewhat accentuated the function of the parts in order that they may be more readily understood. In this instance the neck, 24, of the water circulating element is provided with a relatively small, flanged end portion, 28, and an opening is cut in the throat sheet, 5, of a size just sufficient to admit the flanged end of the element. The flange of the element is placed so that the face thereof is substantially in the plane of the water surface of the throat sheet, 5, and while the parts are in this position they are united permanently as by welding, indicated at 28″. The throat sheet and the element are thus made in effect a single element and can move as such. In an ordinary locomotive opposed sheets, such as 5 and 14, are joined or stayed by means of regularly spaced stay bolts. To the end that expansion and contraction of the various parts may be taken care of, I have formed and supported the throat sheet adjacent the juncture of the water circulating element in the special manner hereinbefore described. In this construction I do not stay the throat sheet, in the usual sense of the word, between the points S—S′, but, on the contrary, enable it to come and go (breathe) in consonance with the ever-changing conditions of the water-circulating element. Outside of the zone of greatest movement I stay the throat sheet as by means of stay bolts, 35, which may be of various construction, but which are preferably of a flexible construction. Thus the throat sheet in the vicinity of the juncture of the water element therewith, becomes in effect a flexible diaphragm and, as such, may at times assume the dotted position shown in Fig. 4, or the full line position shown in Fig. 4ª, of the drawings, and various intermediate positions, depending upon the relative thermal conditions of the element and firebox sheets. As a precautionary measure, I may provide flexible and collapsible stay bolts, 28ª, to limit the movement of the diaphragm-like throat sheet to such range as may be considered necessary or desirable. The typical devices, 28ª, as shown, are composed of two parts so connected that considerable lost motion is permitted, which obviously permits full freedom of movement of the throat sheet within predetermined limits.

Spacing the throat-sheet stay bolts at such distance apart as will afford a proper diaphragm action, and even when the bolts are basketed or made to converge as in Figs. 1, 26, 27 and 32, obviously subjects the outer throat plate, 14, to considerable pressure that would be likely to cause it to bend outwardly unless it were of special form. For this reason I prefer to use this form of my invention with locomotives in which the outer throat sheet, 14, is crowned, since the crowned construction makes the sheet self-supporting throughout a considerable range.

When the water circulating element is to be installed during the manufacture of the locomotive, or when conditions require a new throat sheet, I may connect the element to a throat sheet such as shown in Figs. 5 and 6. In this instance, the neck, 24, of the water circulating element is provided with a flanged end portion, 28ᵇ, which is welded as indicated at 33, to the throat sheet, 5. The throat sheet, 5, in this instance is given a special form along that portion between the lines, Sª, Sª; that is to say, instead of extending the throat sheet in a substantially straight line between those points with the consequent usual tension, I provide an annular corrugation, 100, which obviously places slack in the metal and forms a freer diaphragm. The margins of the diaphragm portion may be supported in the same manner as the throat sheet of Fig. 4. In the instance shown in Fig. 5 such spacing of the stay bolts results in leaving too great an area of the outer throat plate, 14, unsupported, such as would likely cause it to bend outwardly under boiler pressure because of its relatively flat form. I overcome that tendency by providing a reinforcing plate, 14′. This reinforcing plate, 14′, may assume various shapes, but is preferably a circular disk, and since, as stated, this form of my invention is specially for use in locomotives in the course of construction, or where a completely or partially new throat sheet is to be installed, it is obvious that I am able to attach the reinforcing plate to the inner side of plate, 14, without difficulty, before the throat sheet is put in place.

I have given to the reinforcing plate, 14′, a form which adapts it to perform another function, that is to say, I form it with an outwardly extending boss, 14″, which extends through an opening, provided therefor in the outer throat sheet, 14. This boss is internally threaded and receives the wash-out plug, 14‴. One advantage is that the threads cannot easily be crossed and the wash-out plug is reliably held against being blown out under boiler pressure; another advantage is that a wash-out plug of greater size than usual may be safely used.

Figs. 7 and 8 show a form of my invention which is adapted for use either in the initial construction of a locomotive or for subsequent installation, under what I term a "patch" method to be described in detail hereinafter. The throat sheet, as indicated at 101, is formed somewhat abruptly away from the general plane of the main sheet, along the circular line 102, thus forming a bulging diaphragm.

It will now be apparent that by the connection disclosed, flexibility between the water-circulating element and the throat sheet is secured by providing slack in the throat sheet, so that in effect it becomes a diaphragm.

As illustrating some other ways of providing slack in the metal of the throat sheet, reference is made to Figs. 9 and 10. Therein I place slack in the metal by forming the elongated corrugations, 103, in the throat sheet, on each side of the point where the water circulating element joints the throat sheet; in other words, between the water circulating element and the nearest supporting stay bolt, 104. Instead of providing vertical corrugations, as indicated by means of full lines in Fig. 9, of the drawings, I may provide horizontal corrugations, as indicated by means of dotted lines in Fig. 9, to which the reference character 105 has been applied. It should also be understood that, if desired, both vertical and horizontal corrugations may be provided; but when that degree of flexibility is desired the corrugation would preferably assume the annular form heretofore described.

Fig. 11 is like unto Fig. 10, but shows the corrugations, 103′, as pressed or shaped inwardly of the water leg, instead of outwardly, as shown in Fig. 10.

To the end that my circulating element may be installed in existing locomotives, without the necessity of providing an entirely new throat sheet, I have devised a method which is at once simple, cheap, and thoroughly practicable. This is a problem that for a considerable time has baffled solution for the reason that locomotives in use vary in design and shape of the throat sheet in almost every conceivable manner, and yet a practical, flexible, union of the character desired must embody certain fundamental characteristics which render difficult its application to peculiarly shaped throat sheets. The solution of the problem consists in entirely cutting away portions of the throat sheet where the water circulating elements are to be joined to the throat sheet and securing or attaching to the end or neck of the water circulating element a patch-like member which becomes a flexible flange, on the lower end of the water circulating element. This member is coextensive in size with the portion removed from the throat sheet, and may be given the shape most convenient. It is secured in such position and, being flexible, constitutes a diaphragm having the range of flexibility desired. Thus it becomes possible to adapt the water circulating elements of almost standard construction, to locomotives varying greatly in size and form. By cutting away a portion of the throat sheet I am also able to get at the inner side of the outer throat sheet, for the application of a reinforcing plate thereto wihch, it will be understood, is as often necessary in this form of my invention as in those forms already described, because after the structure is completed it is in effect the same; and opposite the throat of the element, the outside sheet is stayed at points rather remotely spaced. As will be seen shortly, this so-called patch member secured to the end or neck of the water circulating element may be formed and shaped in a great many different ways; but its essential characteristic, when fastened in place, will always be found to be the same, to wit, of such flexibility as to constitute a diaphragm having a range of movement sufficient to adjust itself to even extreme variations in the size of the water-circulating element.

The patching method of installing the water circulating element is depicted in a number of different ways in Figs. 12 to 24, inclusive. Figs. 12 and 13 indicate a step in the method wherein openings, 110, have been cut in the throat sheet of a size adapted to take such diaphragm portion of the water circulating element. Before the element is inserted I secure the reinforcing plate, 14′, to the outer throat sheet, 14, but as the construction and function of this has already been described, it will not be again detailed.

In Figs. 14 and 15 will be found steps depicting the joining of the patch-like member, 111, to the neck, 24, of the water circulating element. The member, 111, is provided with an opening, 112, of a size adapted to receive the neck, 24, of the water circulating element which, as shown in Fig. 14, is inserted therethrough. If the angle that the patch 111 assumes with respect to the neck, 24, of the water-circulating element is such that more of the end portion projects at one side than at the other, the end portion may be cut away, as along the dotted line, 113, so that it may be beaded over as shown at 114 in Fig. 15. As a further precaution the parts may be welded along the lines 115 and 115′. When this is done, the diaphragm-like patch, 111, and the water-circulating element become, in effect, an integral unitary structure. To secure the element in the firebox, the patch-like portion, 111, is inserted in the opening, 110, of the throat sheet, and thereafter welded; as along the dotted line 116 (see Figs. 20 and 27), whereupon the completed structure is like in effect and function to the structures described with reference to the other figures of the drawings.

The diaphragm-like patch shown in Figs. 14, 15, 16, 20 and 21, and 27 and 32 is formed by an annular corrugation, 117, which extends toward the end of the water-circulating element. Obviously, the diaphragm may have its corrugation formed to extend in the opposite direction and such a construction is shown in Fig. 17, wherein 118 is the corrugation and 119 is the patch proper.

In Fig. 18 I have illustrated a still further modification. Therein the patch portion 120 is provided with an annular corrugation 121 which it will be understood may extend in either direction from the general plane of the patch; but in this instance is shown as extending away from the end of the water circulating element. The inner or central portion of the patch is drawn or formed into cylindrical shape, as indicated at 122, and of a size such that it may be shrunk upon the extreme end portion, 123, of the water circulating element shown by means of dotted lines in Fig. 18 and by means of full lines in Fig. 18ª. The water circulating element in being secured to the patch is preferably beaded over, as indicated at 124, and welded at 124'. So far as this operation is concerned the welding may be carried out in the manner described in reference to Figs. 14 and 15. The patch or diaphragm may be further united to the neck of the siphon or element as by means of rivets 124''.

Instead of proceeding with the installation of the patch-form of my invention, along the lines just described, I may follow the method depicted in Figs. 22, 23 and 24. In this instance a single large opening, 150, is cut in the throat sheet, 5, at which time the reinforcing plates, 14', if necessary, can be applied. The patch-like members, 151, 152, shown in Fig. 23, in this instance are not alike in size, one being larger than the other. They may be formed in the manner described with reference to any of the patches, and their diaphragm-like construction will not be again detailed. In order that patches of desired size may be had I prefer to start with pieces 151' and 152' of a size larger than the patch necessary. The patches can then be cut to desired size and shape; as along the dotted lines 151'' and 152''.

The two members, 151, and 152, together are co-extensive in size and shape with the opening, 150, provided in the throat sheet, and they are placed therein as shown in Fig. 24. The patch members may be secured to the water element and to the throat sheet as by welding, in any of the ways heretofore described, or in any other suitable manner.

One object of making the patch-like members, 151 and 152, of different sizes is to bring the weld-line, 153, between rows of stay bolts, 154 and 155, thereby relieving the weld of the strain incident to the working pressure of the boiler. This form of my invention also has the advantage of requiring but three vertical welds, for two water elements, as against four vertical welds for that form of my invention described with reference to Figs. 12 and 20.

Fig. 25 illustrates the fact that my invention is readily applicable to throat sheets of various forms, thus it is as well adapted to the form shown in full lines, in which the upper part of the throat sheet makes a rather abrupt angle with the lower part of the throat sheet, as to the form shown by means of dotted lines in which the angle between the upper and lower parts of the throat sheet is less abrupt.

The preferred method of installing the element in an existing firebox is as follows: Stay bolts are removed from the throat sheet in the region to be occupied by the intake throat of the water circulating element. A wide slot or opening (best indicated by the line 32 in Fig. 2) is then made in the crown sheet; the slot extending longitudinally therein and being of sufficient size to receive the top flange, 29, of the element. Similarly an opening is made in the throat sheet, 5, to receive the patch member at the bottom front end of the element. Thereupon the element is placed in position with the edges of its top flange, 29, flush with the edges of the crown sheet at the opening, 32, (see Figs. 2, 29, 30 and 31) and with the edges of the patch or diaphragm flush with the edges of the opening in the sheet, 5. (See Figs. 20, 21, 24, 27 and 32). Then by suitable means, such as an oxy-acetylene torch used in the customary manner, or an electrical appliance, the flange, 29, of the element, and the edges of the patch, are permanently welded or united to the crown sheet, 6, and to the throat sheet respectively. Thus the element is made an integral part of the firebox; in other words is permanently anchored or secured in and to the walls thereof. At the time the large holes are open in the crown sheet the corresponding crown bolts are removed, and seldom are they all replaced, since I usually prefer to leave out the row of bolts directly above the open top, 25, of each element or siphon. (See Fig. 2). Next follows the anchoring of the element to the outside wrapper or shell of the boiler, i. e., to the wrapper plates 12 and 14. The crown or radial bolt holes to remain empty in the wrapper plate, 12, if any, are closed, preferably by the welding process, and thereupon the previously removed radial or crown bolts are replaced in the remaining holes. At such time the necessary holes are bored and tapped in the integral flange, 29, of the element as required to receive the corresponding crown bolts, 34. (See Figs. 2, 29 to 34).) Thus the full complement of crown bolts being provided, it is obvious that the crown sheet is fully supported, and in addition the element itself (through the medium of its integral flange, 29, and the crown bolts therein) is directly supported from the wrapper plate, 12. An important incident is that the weld, 32', between the flange, 29, and the crown sheet is fully protected through being supported by crown bolts on both sides thereof; and, the weld is not relied upon to support the element against the collapsing pressure of the steam in the boiler.

Similarly, the edge of the patch or diaphragm is directly anchored to the throat plate, 14, by means of numerous stay bolts 35' which are spaced a distance apart sufficient to make available the diaphragm action before described. (See Figs. 1, 20, 24, 26, 27 and 32.) It will be understood that the reinforcing plate, 14', is secured in place after the openings are cut in the throat sheet and before the element is put in place.

The method of constructing a completely new firebox, including the water-circulating elements, will be obvious from the foregoing.

Special attention is called to the fact that the narrow outlet, 25, of the element extends practically from end to end of the crown sheet, and is of many times the area or capacity of the intake. (See Figs. 1, 2 and 3 and 28). This, taken in connection with the progressive enlargement of the element upward from the intake, means that although the water is drawn through the restricted intake at a high velocity, the velocity of the discharge through the capacious outlet is so reduced as to prevent the priming of the steam in the upper part of the boiler and yet is sufficient to agitate and circulate the water on the crown sheet and to thus constantly wash or clean the whole crown sheet.

As shown, the water circulating elements become parts of and greatly simplify and stabilize, in each case, a refractory arch or baffle which, to accord with the best practice, must be maintained between the grate and the flue sheet of the firebox. As stated, the intake preferably is larger than the body of the element and its shape is continued or preserved in the lower bulging or beam portion thereof. An incident of this construction is that external bulges or shoulders, 37, are provided upon the sides of the element, as well shown in Figs. 1, 2 and 3. The tapered mandrel, before mentioned, used in making the element stops short of the upper rear corner of the element, that part 22' of the beam portion being left of the same width as the body portion, 23, in order that the outlet, 25, in the top of the element may be of uniform width, as preferred. The shoulders, 37, upon the sides of the element are as here shown, long enough (measured from the throat sheet) to support the component bricks of an arch of the kind here shown. As best shown in Figs. 2 and 3, the ends, 40, of the arch bricks, 39, are shaped to fit upon the top of the beam portion of the element and against the sides of the body portion thereof. The other end of each brick is supported either by a companion element or against a side sheet of the firebox. Thus the element and firebox side sheets provide strong and reliable supports for the refractory arch.

The companion bricks, 39, of each longitudinal row or section may be placed close together as in Figs. 2 and 3, or may be spaced apart if it is desired to secure the effects of a perforated arch. When it is necessary to have access to the flue sheet or given parts of the side, crown or element sheets, any single section of the arch may be lifted out, and later replaced, without interfering with or disturbing the remainder of the arch. These functions and advantages are important.

The vertical water element or elements serve as vertical baffles which divide the upper, forward part of the firebox into a plurality of longitudinal flame or combustion passages, and the refractory arch sections, by forming bottoms for such passages, make the latter into distinct combustion chambers. The flames rising from the lower part of the firebox are forced toward the rear end thereof and thence enter these passages or chambers. Meantime the vertical and horizontal baffling of the gases and their impingement upon the vertical elements and the horizontal arch, insures the thorough admixture of the gases with the accompanying air, and the combustion is reliably completed in the water-element-formed combustion chambers before the products reach the flues, 8.

Where the arch is in three or more sections, as is here shown, these sections are availed of for the purpose of regulating the draft in the firebox. Thus if the natural tendency is to gather the products of combustion into the central group of flues, the middle section of the arch is made longer than the side section, as shown in Fig. 2, and thereby the products are diverted into the side combustion chambers. Where a contrary tendency is noted, the side sections of the arch are made longer than the middle section to accomplish the desired regulation. Similar effects may be secured by spacing the component bricks apart in different ways to leave regulating spaces between them; which is a matter merely of properly placing the bricks upon the convenient supports afforded by the elements or thermic siphons, and between the same and the side sheets of the firebox. The water circulating and steaming elements and the side sheets are far enough apart to admit workmen to such surfaces and to the flue sheet, and it may here be noted that any closer spacing of the elements would so restrict the combustion passages as to tend to suppress rather than to promote combustion therein.

These water circulating elements or siphons lend themselves nicely to use in locomotive boilers of such proportions that it is desirable to retain all of the flue heating-surface. In such cases the front, 26, of the element or elements, as herein shown, may be set back from the flue-sheet far enough to leave the flues, 8, unobstructed, and to make room for the doing of all necessary work thereon. A wide spacing is not requisite but a spacing such as here defined is advantageous.

To facilitate and insure good washing and inspection of the interior of each element or siphon, I provide a wash-out plug 14ª in the back head or plate 15, and plugs 14ᵇ in the top 12 above the opening or slot in the crown sheet. At boiler washing times these plugs and the plug 14‴ are removed, which affords access to the inside of the element and adjoining parts of the throat sheet and crown sheet.

A water-steaming and circulating element of generally triangular shape, and hence of smoothly sweeping lines, presents many advantages; among which the following may be especially noted: It is self-cleaning. It contains neither steam pockets nor scale pockets. Its body portion is relatively rigid, so that movements of expansion and contraction are transmitted to its free end and throat sheet, where they may be absorbed by a take-up construction, such as the diaphragm described. The inclined bottom, trough, or beam portion affords ample firing clearance beneath it, and beneath the arch or baffle which it supports. Presenting a clear path, the beam or trough portion is sure to be kept clean by the upward sweep of water thereon. The shape of the element affords a maximum increase of firebox heating surface and positions the added heating surfaces in the best possible relation to the fuel bed and to the flames. In such position, the sides of the water element are heated equally, and hence are free from stay bolt troubles and difficulties of expansion and contraction. Of which more will be said hereinafter.

The word "triangle" is not used in this specification, because it would be too limited a definition of the shape of the water circulating element; and because the shape of a true triangle is neither necessarily nor strictly preserved. But the term "triangular" is frequently used herein; this in the generally descriptive sense of a substantially three-cornered and substantially flat object, the corner portions of which are connected by smoothly sweeping lines or surfaces. And specifically, when the term "triangular" is used herein, it implies an element having the characteristics of an inverted triangle; and, accurately described, the open top of the water circulating element or siphon must be called its open "base", and the lower end or corner which contains the restricted inlet or throat must be said to be its "apex". This explanation is made in order to avoid herein the frequent use of such awkward terms as "inverted generally triangular shape in side elevation"; and the like. Also to the end that the use of the seemingly erroneous or inverted terms "base" and "apex" shall be properly understood and interpreted in the appended claims.

As well indicated in Figs. 1 and 3, while the water is projected from the elements with such force as to insure positive distribution and circulation on the crown sheet, and a very free disengagement of the steam, the wide and free distribution effected by the elongated open base of each element permits such operation without piling the water against the back head or plate of the boiler shell. Such piling of water would cause violent fluctuations in, and false indications by the water gages (not shown) and make it difficult for the engine crew to know or ascertain the true level of the water in the boiler.

Fireboxes containing my novel circulating elements or thermic siphons possess factors of safety not present in the ordinary locomotive firebox. As will be obvious each element thus connected with the crown sheet of a firebox operates as a truss or brace therefor and also operates to brace the box longitudinally, and diagonally from its lower forward part to its upper back corner. In addition to these factors and due to the very positive siphoning operation of the devices it is found that even when the water level in the body of the boiler falls considerably below the level of the crown sheet it is still safe to continue the operation of the boiler because the crown sheet is kept flooded by the great volume of water ascending through and fountaining from the water circulating elements.

Notwithstanding the element of safety just explained, it may be contended that a serious accident would result if the water level were permitted to fall too far below the crown sheet, but here a further advantage of my structure becomes apparent. This further advantage is an outgrowth of the manner in which the crown sheet of the firebox is stiffened and extensively supported from beneath by the described water circulating element or elements. Thereby the crown sheet is divided into a number of small sections which may act separately, and thus any possible rupture or bagging of the crown sheet is restricted and localized; from which it follows that if such an accident occurs the steam in the boiler will be allowed to escape gradually and there can be no sudden drop of boiler pressure such as would cause the flashing of the boiler water into steam and a serious explosion; this as contrasted with the all too frequent and fatal accidents caused by the dropping of ordinary crown sheets; which, being supported only from the top, totally lack any means limiting the extent to which they may tear away from the crown bolts and other firebox sheets.

As shown and described, this water circulating element of my invention is suspended in the chamber into which the flames rise from the fire. In consequence of this relation, the many stay bolts of the element and its side portions are rendered safe and durable; for, disregarding possible slight variations, the temperature on one side of the water element is always the same as that on the other side and the two sides therefore expand and contract equally. This being true there is no tendency to crack or bulge the sheets or to displace or break any of the stay-bolts.

The term "self-cleaning" as used in this specification and in the appended claims has two relations to the structure and its operation. It has an active relation and a passive relation. The active relation concerns the operation of the water circulating element under the effect of the radiant heat from the fire in the firebox, and the passive relation has to do with the operation at times when the fire is dumped or extinguished and until the boiler is again fired. The forms and relations of the several parts of the element are such that it does not tend to retain or retard the steam, the contained water, or substances held in solution or suspension; nor does it present any place or places for the lodgment or trapping of either steam or solids; which would result in the burning out of the sheets or in the rapid formation of scale on the water surfaces, to be followed by the cracking and burning of the sheets. Therefore during both active and passive periods the element effectively keeps itself clean; and, incidentally, causes an agitation on the crown sheet which resists the lodgment of deposits that might form a destructive scale.

These statements will be better understood when it is observed that the water intake at the bottom is small, compared with the large water and steam outlet at the top of the element, and that the enlargement of the body of the element between those points proceeds gradually and substantially in proportion to the compensating evolution of steam therein; whereby a positive and rapid sweep of water is maintained throughout the element; giving assurance of the active discharge of impurities and solids across the top of the firebox, thence to fall into the deep water legs or to be carried forward into the quieter parts of the boiler.

Obviously the strong upward rush or sweep of water on the internal surfaces of the element insures the instant disengagement of all steam bubbles evolved thereon, so that the heating surfaces are maintained at maximum efficiency. A further function of this peculiarly shaped element is to immediately free the disengaged steam bubbles by allowing them to rise directly to the wide open outlet without any departure from their normally vertical paths of ascent, except as interrupted by the component stay bolts of the element. When built in the best form, my novel water element presents no overhanging surfaces which can materially hold or tend to collect and retard the steam bubbles. For this reason I prefer to make the element in the form herein shown, to-wit, with a front end or wall which does not materially overhang the water space therein.

As stated, the self-cleaning characteristic of the described water circulating element is not restricted to the period of its active operation, for the element has a like important action at times when the fire is extintant and the water in the boiler becomes quiescent. At such times the vertical walls and the downwardly pitched bottom or trough portion of the element present no points for lodgment of precipitated solids and therefore allow the free gravitation thereof of the intake opening of the element, and thence into the water space with which it communicates at the bottom of the boiler. Arriving there, the solids are so far removed from the sheets which may still remain hot, or which may be re-heated when the boiler is again fired, as to prevent the hardening of the deposits or the formation of scale before the boiler is next emptied and washed.

With reference to the self-cleaning operation of the element during the passive period, it may be remarked that, as a rule, when a locomotive returns from a run, the fire is dumped at the cinder pit, and the engine is run into the roundhouse under the steam remaining in the boiler; ebullition has ceased and consequent precipitation of solids begun, and the surging of the boiler water, due to the movement of the engine, insures the downward sweeping of the precipitated solids from the element and into the communicating cool water space.

By reason of these, and perhaps other causes, the described siphons have been found to be effectively self-cleaning, and hence of a constantly maintained heating value; and altogether safe; and, of great durability.

Having thus described my invention, I claim as new and desire to secure by Letters Patent:

1. A locomotive boiler firebox, the bottom and rearward portion of which constitutes a single fire chamber and the upper and forward portion of which is divided into a plurality of combustion passages by one or more hollow, substantially vertical, water-steaming walls, each having a restricted inlet at the bottom, and which, by thermal action, operate to cause a circulatory flow of water from the part of the boiler below the body of flues therein to the part above the crown sheet of the firebox.

2. A locomotive boiler firebox, the bottom and rearward portion of which constitutes a single fire chamber and the upper and forward portion of which is divided into a plurality of combustion passages by one or more hollow, substantially vertical, water-steaming walls, each having a restricted inlet at the bottom, and which, by thermal action, operate to cause a circulatory flow of water from the part of the boiler below the body of flues therein to the part above the crown sheet of the firebox, and baffle brick coöperating with said wall or walls in the distribution of flame within said firebox.

3. A locomotive boiler firebox, the bottom and rearward portion of which constitutes a single fire chamber and the upper and forward portion of which is divided into a plurality of combustion passages by one or more hollow, substantially vertical, water-steaming walls, each having a restricted inlet at the bottom, and which, by thermal action, operate to cause a circulatory flow of water from the part of the boiler below the body of flues therein to the part above the crown sheet of the firebox, and refractory brick supported by said wall or walls and coacting therewith in the distribution of flame within the firebox.

4. A locomotive boiler firebox, the bottom rearward portion of which constitutes a single fire chamber and the upper and forward portion of which is divided into a plurality of combustion passages by one or more hollow, substantially vertical, water-steaming walls, each having a restricted inlet at the bottom, and which, by thermal action, operate to cause a circulatory flow of water from the part of the boiler below the body of flues therein to the part above the crown sheet of the firebox, and a brick baffle incorporated with said wall or walls and therewith governing the draft in said firebox.

5. A locomotive boiler firebox, the bottom and rearward portion of which constitutes a single fire chamber and the upper and forward portion of which is divided into a plurality of combustion passages by one or more hollow, substantially vertical, water-steaming walls, each having a restricted inlet at the bottom, and which, by thermal action, operate to cause a circulatory flow of water from the lower part of the boiler to the part above the crown sheet of the firebox, and each said wall presenting a laterally offset portion adapted to hold arch brick.

6. A locomotive boiler firebox, the bottom and rearward portion of which constitutes a single fire chamber and the upper and forward portion of which is divided into a plurality of combustion passages by one or more hollow, substantially vertical, water-steaming walls, each having a restricted inlet opening at the lower end and each bottomed by a bulging beam portion, and which, by thermal action, operate to cause a circulatory flow of water from the part of the boiler below the body of flues therein to the part above the crown sheet of the firebox, substantially as described.

7. A locomotive boiler firebox, the bottom and rearward portion of which constitutes a single fire chamber and the upper and forward portion of which is divided into a plurality of combustion passages by one or more substantially vertical, internally stay bolted water-steaming walls which by thermal action, operate to cause a circulatory flow of water from the lower part of the boiler to the part above the crown sheet of the firebox, each said wall comprising a body and a bottom part and the bottom part of each said wall being of greater width than the body of the wall, substantially as described.

8. A locomotive boiler firebox, the bottom and rearward portion of which constitutes a single fire chamber and the upper and forward portion of which is divided into a plurality of combustion passages by a hollow, substantially vertical, water-steaming and circulating wall having a trough-like beam portion and a restricted water inlet that opens through the lower part of the front sheet of the firebox, and the top of which opens into the space above the crown sheet of the firebox at the rear end thereof, for the purpose specified.

9. A locomotive boiler firebox, the bottom and rearward portion of which constitutes a single fire chamber and the upper and forward portion of which is divided into a plurality of combustion passages by a hollow, substantially vertical, water-steaming and circulating wall having a trough-like beam portion that opens through the lower part of the front sheet of the firebox, and the top of which opens into the space above the crown sheet of the firebox at the rear end thereof, said beam portion being of greater cross section than the body of the wall, from its lower forward end to a point below said crown sheet, for the purposes specified.

10. A locomotive boiler firebox, the bottom and rearward portion of which constitutes a single fire chamber and the upper and forward portion of which is divided into a plurality of combustion passages by a hollow, internally-stayed, substantially vertical and triangular wall, the top of which preseents an elongated longitudinal opening in the crown sheet of the firebox, and which wall has an uninterrupted trough-like bottom, the lower end of which is formed into a restricted intake neck portion that opens through the lower part of the firebox, substantially as described.

11. A locomotive boiler firebox, the bottom and rearward portion of which constitutes a single fire chamber and the upper and forward portion of which is divided into a plurality of combustion passages by a hollow, internally-stayed, substantially vertical and triangular water wall, the top of which presents an elongated longitudinal opening in the crown sheet of the firebox, and which wall has an uninterrupted trough-like bottom, the lower end of which is formed into a restricted intake neck portion that opens through the lower part of the firebox, and a brick baffle which coacts with said wall in the distribution of flame in said firebox.

12. A locomotive boiler firebox, the bottom and rearward portion of which constitutes a single fire chamber and the upper and forward portion of which is divided into a plurality of combustion passages by a hollow, internally-stayed, substantially vertical and triangular water wall, the top of which presents an elongated longitudinal opening in the crown sheet of the firebox, and which wall has an uninterrupted trough-like bottom, the lower end of which is formed into a restricted intake neck portion that opens into the lower part of the boiler through the medium of an expansion and contraction absorbing device, substantially as described.

13. A locomotive boiler firebox, the bottom and rearward portion of which constitutes a single fire chamber and the upper and forward portion of which is divided into a plurality of combustion passages by a hollow, internally-stayed, substantially vertical and triangular water-steaming and circulating wall, the top of which presents an elongated longitudinal opening in the crown sheet of the firebox, and the inclined bottom of which comprises a bulging beam portion having its lower end formed into a restricted intake neck that opens through the throat sheet of the firebox.

14. A locomotive boiler firebox, the bottom and rearward portion of which constitutes a single fire chamber and the upper and forward portion of which is divided into a plurality of combustion passages by a hollow, internally-stayed substantially vertical and triangular water-steaming and circulating wall, the top of which presents an elongated longitudinal opening in the crown sheet of the firebox, and the inclined bottom of which comprises a bulging beam portion having its lower end formed into a restricted throat portion that opens through the throat sheet of the firebox, and refractory baffles resting on said bulging beam portion, substantially as described.

15. A locomotive boiler firebox, in combination with one or more hollow, substantially vertical and triangular, water-steaming and circulating walls therein, the top of each wall opening into the space above the crown sheet, and each said wall being bottomed by a beam portion, the lower end of which forms an intake throat through which restricted communication is established with the bottom of the boiler.

16. A boiler firebox, the bottom portion of which constitutes a fire chamber and the upper portion of which is divided into a plurality of combustion spaces by one or more hollow, internally-stayed, substantially vertical and triangular walls, each of which opens through the top of the firebox and each having an uninterrupted trough-like bottom, and an intake neck through which communication is established between the same and the bottom of the boiler.

17. A boiler firebox, in combination with one or more hollow, substantially vertical and triangular water-steaming walls therein, the top of each wall opening through the top of the firebox and each said wall being bottomed by a bulging portion the lower end of which opens into the bottom of the boiler and the upper part of which merges with the sides of said wall whereby the configuration of the opening through the crown sheet is made the same as the interior of said wall.

18. A boiler firebox, in combination with one or more hollow, substantially vertical water-steaming walls therein, the top of each wall opening through the top of the firebox and each said wall being bottomed by a bulging inclined portion which forms an intake throat through which communication is established with the bottom of the boiler.

19. A locomotive boiler firebox, the bottom and rearward portion of which constitutes a single fire chamber and the upper and forward portion of which is divided into a plurality of combustion passages by a hollow, substantially vertical and triangular water-steaming and circulating wall the base of which opens through the crown sheet of the firebox and the apex whereof opens into the bottom part of the boiler forward of the firebox, substantially as described.

20. A locomotive boiler firebox, the bottom portion of which constitutes a single fire chamber and the upper portion of which is divided into a plurality of combustion spaces by a hollow, internally-stayed, substantially vertical and triangular water-steaming and circulating wall the top of which opens through the crown sheet of the firebox and the apex whereof opens through a firebox sheet adjacent the bottom of the boiler.

21. A locomotive boiler firebox, the bottom portion of which constitutes a single fire chamber and the upper portion of which is divided into a plurality of combustion spaces by a hollow, internally-stayed, substantially vertical and triangular water-steaming and circulating wall the top of which opens through the crown sheet of the firebox and the apex whereof opens through a firebox sheet adjacent the bottom of the boiler, and a cross baffle in the firebox and coöperating with said wall in the distribution of flame.

22. A sheet metal, boiler firebox, in combination with one or more mainly flat, hollow, internally-stayed, substantially triangular water-steaming and circulating walls made of sheet metal and extending longitudinally therein, the bases of which open through the top of the firebox and the apexes of which are connected with the lower part of the boiler, the internal surface of each said wall sweeping uninterruptedly from apex to base.

23. A locomotive boiler firebox, the bottom portion of which constitutes a single fire chamber and the upper portion of which is divided into a plurality of combustion spaces by a mainly flat, hollow, internally-stayed, substantially vertical and triangular water wall, the top of which presents a longitudinally elongated opening in the crown sheet of the firebox and the apex of which wall opens through a firebox sheet adjacent the bottom of the boiler.

24. A sheet metal boiler and internal firebox, in combination with one or more mainly flat, hollow, internally-stayed, substantially triangular water-steaming and circulating walls made of sheet metal, the elongated base of each wall opening through the top of the firebox and the apex of each wall being in circulatory connection with the lower part of the boiler, and the internal surface of each wall sweeping uninterruptedly from apex to base.

25. A sheet metal boiler and internal firebox, in combination with one or more mainly flat, hollow, internally-stayed, substantially triangular water-steaming and circulating walls made of sheet metal, the elongated base of each wall opening through the top of the firebox and the apex of each wall having an extension neck which connects with the lower part of the boiler, and the internal surface of each wall sweeping uninterruptedly from the neck to the top of the firebox.

26. A sheet metal steam boiler having a mainly flat, hollow, internally-stayed, vertical, water-steaming and circulating wall of inverted substantially triangular shape, made of sheet metal, and extending longitudinally with respect to the body of the boiler, the base of said wall opening into the upper portion of the boiler, the apex of the said wall being in circulatory connection with the lower part of said boiler, and the internal surface of said wall sweeping uninterruptedly from apex to base.

27. A sheet metal steam boiler having a mainly flat, hollow, internally-stayed, vertical, water-steaming and circulating wall of inverted substantially triangular shape, made of sheet metal, and extending longitudinally in the firebox of the boiler, the base of said wall opening into the upper portion of the boiler, the apex of the said wall being in circulatory connection with the lower part of said boiler, and the internal surface of said wall sweeping uninterruptedly from apex to base, and means co-acting with said wall in the distribution of flame in the firebox of said boiler.

28. A locomotive boiler shell, firebox and flues, in combination with one or more water-steaming and circulating walls which divide the upper forward portion of said firebox into a plurality of longitudinal passages leading to said flues, each said wall being made of sheet metal with its side portions stay-bolted, one to the other, and each bottomed by a bulging beam portion of upward and rearward inclination, said wall or walls establishing communication between the water spaces at the bottom and top of said firebox, and refractory arch brick supported by said beam portion of each said wall.

29. A locomotive boiler shell, firebox and flues, in combination with one or more water-steaming and circulating walls which divide the upper portion of said firebox into a plurality of longitudinal passages leading to said flues, each said wall being made of sheet metal with its side portions stay-bolted, one to the other, and each bottomed by a brick-supporting bulging beam portion of upward and rearward inclination, said wall or walls establishing communication between the water spaces at the bottom and top of said firebox, and said bulging portion in each case terminating short of the upper rear end of the wall, for the purposes specified.

30. A boiler firebox, the bottom portion of which constitutes a fire chamber and the upper portion of which is divided into a plurality of combustion spaces by one or more hollow, internally-stayed, substantially vertical and triangular walls, each of which opens through the top of the firebox and each having an uninterrupted trough-like bottom, and an intake neck through which communication is established between the same and the bottom of the boiler, suitable means being provided to take up the relative expansion and contraction of said firebox and each said wall.

31. A locomotive boiler shell, firebox and flues, in combination with a water-steaming and circulating vertical wall which divides the upper part of said firebox into longitudinal passages leading to said flues, said wall being made of sheet metal with its side portions stayed, one to the other, the lower end of said wall terminating in an intake neck which opens through the front sheet of the firebox and said firebox being externally-stayed except in that portion of said front sheet which receives said neck, and which portion has a free diaphragmic action that absorbs the expansion and contraction of said wall.

32. A locomotive boiler shell, firebox and flues, in combination with a water-steaming and circulating vertical wall longitudinally disposed in the upper part of said firebox, said wall being made of sheet metal with its side portions stayed, one to the other, and establishing circulatory communication between the water spaces at the bottom and top of said firebox, said firebox being externally-stayed except in a portion of the firebox sheet which receives the lower end of said wall and the portion thus left free being adapted to diaphragmic action which absorbs the expansion and contraction of said wall.

33. A steam boiler shell, and its internal firebox, in combination with a substantially rigid water steaming and circulating element in said firebox and which establishes communication between boiler water spaces adjacent the firebox, said element at its ends opening through said sheets into respective spaces, and said firebox being externally-stayed to the boiler shell except in that portion of a firebox sheet which receives an end of said element, which portion is flexible and free to absorb the expansion and contraction of said element.

34. A locomotive boiler shell, firebox and flues, in combination with a water-steaming and circulating wall which divides the upper part of said firebox into a plurality of combustion spaces, said wall being made of sheet metal with its side portions stayed, one to the other, and bottomed by an upwardly pitched beam portion, the lower end of which terminates in an intake neck which opens through the lower part of the firebox, said firebox being externally-stayed except in that portion which receives said neck, which portion is corrugated and left free to absorb the expansion and contraction of said wall.

35. A locomotive boiler firebox, in combination with a substantially rigid water circulating element disposed in said firebox and having ends which open through the sheets thereof at different elevations, and one end of said element being provided with a flexible flange portion through the medium of which a mechanical expansion and contraction absorbing connection is made with its associated sheet.

36. A locomotive boiler firebox, in combination with a substantially rigid water circulating element disposed in said firebox and having ends which open through the sheets thereof at different elevations and one end of said element being provided with a flexibly corrugated flange portion through the medium of which a mechanical expansion and contraction absorbing connection is made with its associated sheet.

37. A locomotive boiler firebox, in combination with a substantially rigid water circulating element disposed in said firebox and having ends which open through the sheets thereof at different elevations, one end of said element being provided with a corrugated expansion and contraction absorbing flange, the outer margin of which is joined to its associated sheet.

38. A locomotive boiler shell and firebox, in combination with a water circulating element disposed in said firebox and having ends which open through the sheets thereof at different elevations, one end of said element being provided with a corrugated expansion and contraction flange, the outer margin of which is joined to its associated sheet and stay-bolted to the shell of the boiler.

39. A locomotive boiler shell and its externally stayed firebox, in combination with a water circulating element disposed in said firebox and having ends which open through the sheets thereof at different elevations, one end of said element being provided with a flange, the outer margin of which is welded to its associated stayed sheet, and stay-bolts joining said flange to the shell of the boiler.

40. A locomotive boiler shell and the externally stayed firebox therein, in combination with a water circulating element disposed in said firebox and having ends which open through the firebox sheets at different elevations, one end of said element being provided with a flange portion which is welded to the associated stayed firebox sheet, in flush relation thereto, and stays connecting said flange to the opposed part of the boiler shell.

41. A locomotive boiler shell and the externally stayed firebox therein, in combination with a water circulating element disposed in said firebox and having ends which open through the firebox sheets at different elevations, one end of said element being provided with a flange portion which is welded to the associated stayed firebox sheet, in flush relation thereto, and stays connecting said flange to the opposed part of the boiler shell, and means reinforcing that part of the boiler shell within the compass of said stays, substantially as described.

42. A locomotive boiler shell and the externally stayed firebox therein, in combination with a water circulating element disposed in said firebox and having ends which open through the firebox sheets at different elevations, one end of said element being provided with a corrugated flange portion which is welded to the associated firebox sheet, in flush relation thereto, and stays connecting the marginal portion of said flange to the opposed part of said shell.

43. A locomotive boiler shell and the externally stayed firebox therein, in combination with a water circulating element disposed in said firebox and having ends which open through the firebox sheets at different elevations, one end of said element being provided with a corrugated flange portion which is welded to the associated firebox sheet, in flush relation thereto, and stays connecting the marginal portion of said flange to the opposed part of said shell, said stays being spaced together more closely in said shell than in said marginal portion of said flange, substantially as and for the purpose specified.

44. A locomotive boiler shell and contained firebox, in combination with a water circulating wall longitudinally disposed in said firebox and dividing the upper portion thereof into a plurality of combustion spaces, the top of said wall opening through the top of said firebox, a neck forming a water intake connection between the bottom of said water wall and the boiler space at the end of the firebox, a mechanical connection between said neck and the end sheet of the firebox comprising a flexible flange fixed on said neck and having its margin welded to said end sheet, said end sheet being externally stayed, and other stays joining the marginal portions of said flange to the opposed part of the boiler shell, substantially as and for the purpose specified.

45. A boiler shell and its contained firebox, separated by water spaces and said firebox composed of metal sheets which contain openings for the reception of a water circulating element and which sheets are suitably stay-bolted to said shell, in combination with a water circulating element having an end which fills a respective opening in the firebox sheet and which is butt-welded to said sheet, and stay-bolts directly joining said end of the water circulating element to the boiler shell; whereby the duty of supporting the water circulating element is divided between said shell and said firebox sheet.

46. A boiler shell and its contained firebox, separated by water spaces and said firebox being composed of metal sheets which contain openings for the reception of the ends of a water circulating element and which sheets are suitably stay-bolted to said shell, in combination with the water circulating element having end flanges which fill respective openings in the firebox sheets and which are welded to respective sheets, and stay-bolts which in each case directly join the flanges of the water circulating element to the boiler shell; whereby the duty of supporting the water circulating element is divided between said shell and said firebox sheets.

47. A locomotive boiler firebox, in combination with a water circulating and steaming element therein and opening through its crown sheet, said element comprising mutually stayed metal walls the upper edge of said metal walls being flared outwardly to provide the element with an integral top flange, which flange frames the open top of said element and merges with the crown sheet of the firebox, crown stays secured in said flange for the support of the element, and other crown stays supporting the remaining part of said crown sheet.

48. A locomotive boiler firebox, in combination with a water circulating and steaming element therein and opening through its crown sheet, said element comprising mutually stayed metal walls, the upper edge of said metal walls being flared outwardly to provide the element with an integral top flange which flange frames the open top of said element and merges with the crown sheet of the firebox in butt weld relation thereto, crown stays secured in said flange for the support of the element, and other crown stays supporting the remaining part of said crown sheet.

49. A new article of manufacture; being a water-steaming and circulating thermic siphon for incorporation in the circulatory system of a steam boiler, and comprising a hollow wall of generally inverted-triangular shape in side elevation, and composed of sheet metal portions, in combination with stay-bolts spacing apart its side portions, the top of said wall presenting an elongated outlet opening framed by an outwardly turned flange, and at its lower end presenting a smaller intake opening, the interior surface of said wall sweeping uninterruptedly from intake to outlet, and its top and lower end being adapted for connection with other walls of the circulatory system of a steam boiler.

50. A new article of manufacture, being a water-steaming and circulating thermic siphon for incorporation in the circulatory system of a steam boiler, and comprising a hollow wall of generally inverted-triangular shape in side elevation, and composed of sheet metal portions, in combination with stay-bolts spacing apart its side portions, the top of said wall presenting an elongated outlet opening and the lower end of said wall presenting an intake neck of smaller and circular cross-section, and its top and neck being adapted for connection with other walls of the circulatory system of a steam boiler.

51. A new article of manufacture, being a water-steaming and circulating thermic siphon for incorporation in the circulatory system of a steam boiler, and comprising a hollow wall of generally inverted-triangular shape in side elevation, and composed of sheet metal portions, in combination with stay-bolts spacing apart its side portions, the top of said wall being outwardly flared and presenting an elongated outlet opening the lower end of said wall constituting an intake throat of less area than said outlet opening, the interior surface of said wall sweeping uninterruptedly from intake to outlet, and said top and throat being adapted for connection with other walls of the circulatory system of a steam boiler.

52. A new article of manufacture; being a water-steaming and circulating thermic siphon for incorporation in the circulatory system of a steam boiler, and comprising a hollow wall of generally inverted-triangular shape in side elevation, and composed of sheet metal portions, in combination with stay-bolts spacing apart its side portions, the top of said wall presenting an elongated outlet opening, said wall being bottomed by a trough-like portion which at the lower end terminates in an intake neck of smaller and circular cross-section, and said top and neck being adapted for connection with other walls of the circulatory system of a steam boiler.

53. A new article of manufacture; being a water-steaming and circulating thermic siphon for incorporation in the circulatory system of a steam boiler, and comprising a hollow wall of generally inverted-triangular shape in side elevation, and composed of sheet metal portions, in combination with stay-bolts spacing apart its side portions, the top of said wall presenting an elongated outlet opening, said wall being bottomed by a bulging beam portion, the lower end of which terminates in an intake neck, and said top and neck being adapted for connection to the outer walls of the circulatory system of a boiler.

54. A new article of manufacture; being a water-steaming and circulating thermic siphon for incorporation in the circulatory system of a steam boiler, and comprising a hollow wall of generally inverted-triangular shape in side elevation and having an elongated opening at the top, and composed of sheet metal portions, in combination with stay-bolts spacing apart its side portions, the top of said wall being flared outwardly and forming a supporting flange which frames said elongated outlet opening, the bottom of said wall terminating in a smaller intake neck, the interior surface of said wall sweeping uninterruptedly from intake to outlet, and said top and neck being adapted for connection with the circulatory system of a steam boiler.

55. A new article of manufacture; being a water-steaming and circulating thermic siphon for incorporation in the circulatory system of a steam boiler, and comprising a hollow wall of generally inverted-triangular shape in side elevation and having an elongated opening at the top, and composed of a single sheet of metal, in combination with stay-bolts spacing apart its side portions, said sheet, at the top of said wall, being flared outwardly and forming a supporting flange which frames said elongated outlet opening in said wall, the bottom of said wall terminating in a smaller intake neck, and the interior surface of said wall sweeping uninterruptedly from intake to outlet.

In testimony whereof I have hereunto set my hand this 20th day of December, 1918.

JOHN L. NICHOLSON.

It is hereby certified that in Letters Patent No. 1,337,720, granted April 20, 1920, upon the application of John L. Nicholson, of Chicago, Illinois, for an improvement in "Locomotive-Boilers," errors appear in the printed specification requiring correction as follows: Page 1, line 18, for the word "shell" read *shall;* page 5, line 28, for the word "joints" read *joins;* page 7, line 10, strike out the bracket after the numeral "34"; page 8, line 45, for the word "especially" read *specially;* page 9, line 115, for the word "of" read *to;* and that the said Letters Patent should be read with these corrections therein that the same may conform to the record of the case in the Patent Office.

Signed and sealed this 1st day of June, A. D., 1920.

[SEAL.]

M. H. COULSTON,
*Acting Commissioner of Patents*

Cl. 122—68.